Dec. 5, 1961  G. E. MANTHORP  3,011,623
BELT CONVEYOR IDLER
Filed Aug. 18, 1958  2 Sheets-Sheet 1
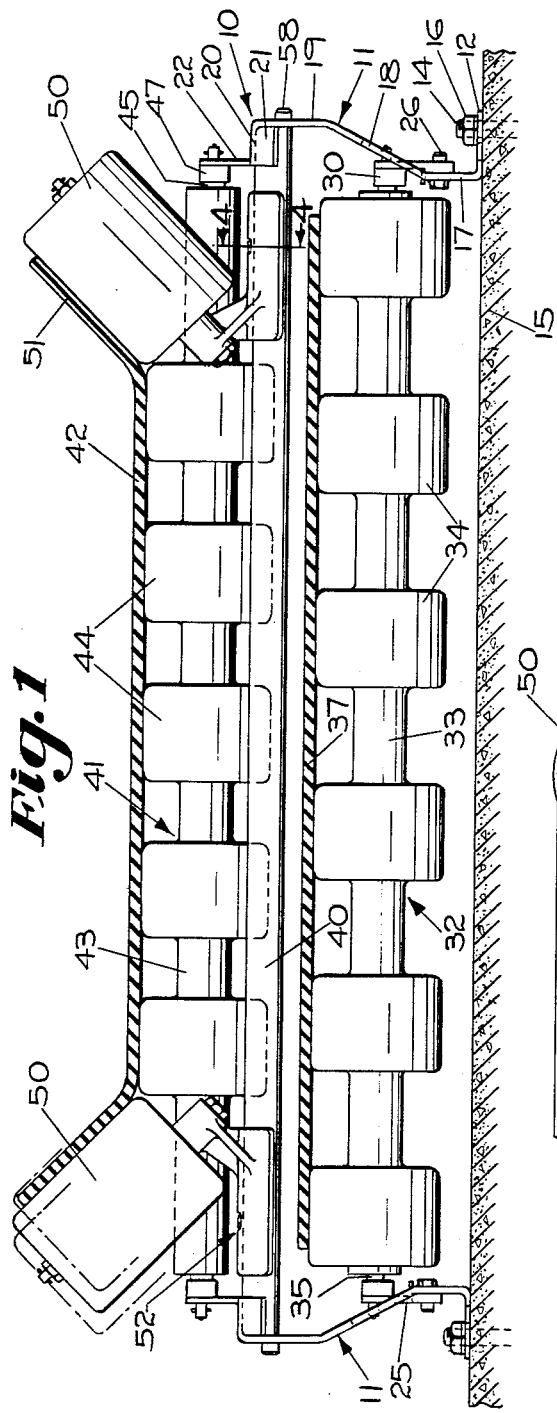
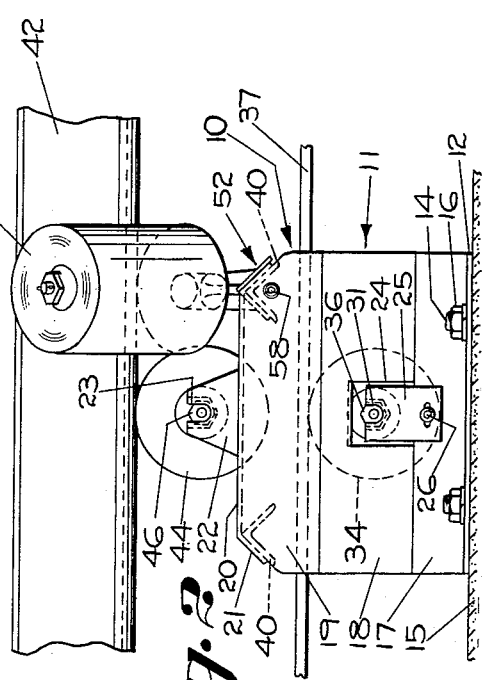
INVENTOR:
GEORGE E. MANTHORP,
BY David Young
ATT'Y.

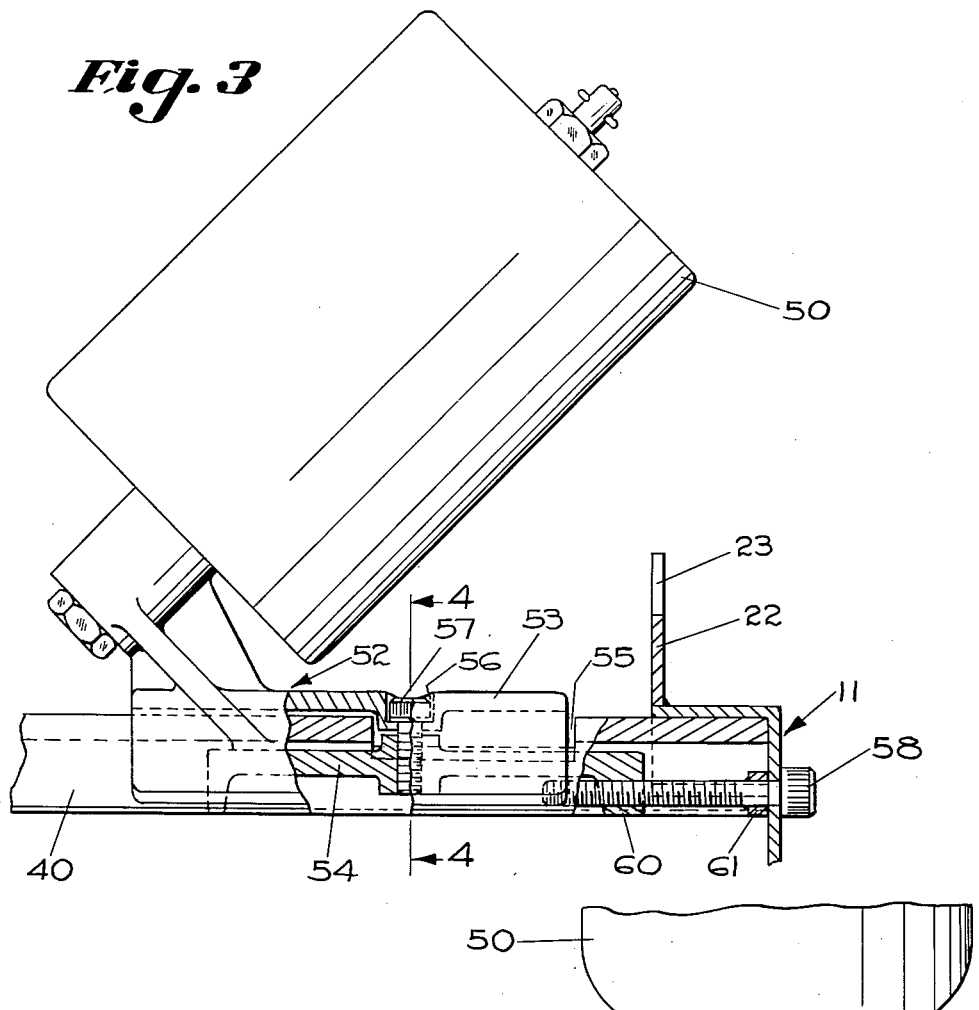
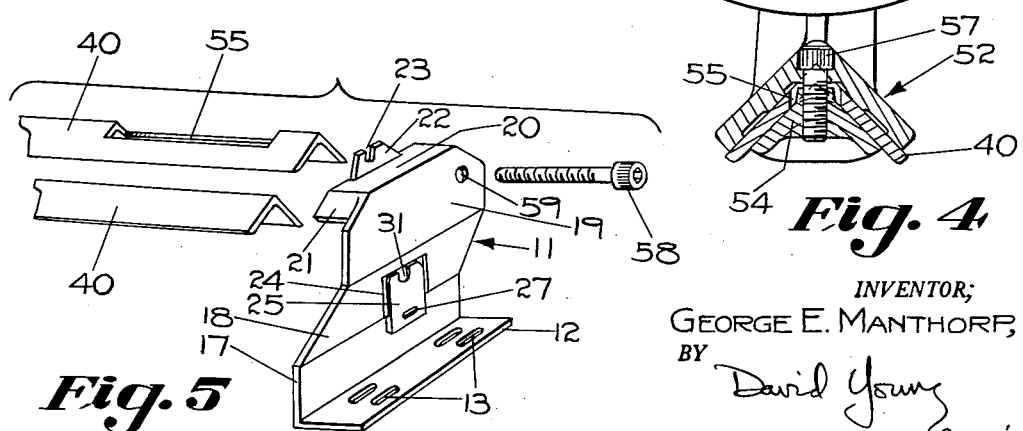

3,011,623
BELT CONVEYOR IDLER
George E. Manthorp, Montreal, Quebec, Canada, assignor to The Jeffrey Manufacturing Company, a corporation of Ohio
Filed Aug. 18, 1958, Ser. No. 755,745
3 Claims. (Cl. 198—192)

The instant invention relates to belt conveyors, and more particularly to an improved idler assembly for supporting and guiding the belt in such a conveyor.

It is the prime object of the instant invention to provide an improved idler assembly, including troughing rolls, for a conveyor belt.

It is another object of the instant invention to provide an improved idler assembly for a belt conveyor including troughing idler rolls for the load carrying run of the conveyor belt, in which the troughing rolls are adjustable in a direction laterally of the run of the conveyor belt.

It is a further object of the instant invention to provide an improved idler assembly for a belt conveyor including troughing idler rolls for the load carrying run of the conveyor belt, having a bracket for rotatably supporting each troughing roll, and a frame member in the idler assembly for mounting the bracket and troughing roll, with releasable means securing the bracket to the frame member and permitting the bracket and troughing roll to be adjusted on the frame member.

It is also an object of the instant invention to provide an improved idler assembly for a belt conveyor including a troughing idler roll, and a frame assembly on which the troughing roll is adjustably mounted, including means on the frame assembly for adjusting the position of the troughing roll laterally of the run of the conveyor belt.

It is still another object of the instant invention to provide an idler assembly for a belt conveyor comprising a frame assembly having oppositely disposed stands spaced from each other and forming the sides of the frame assembly, with the stands including means for mounting idler rolls thereon for supporting and guiding the conveyor belt.

A still further object of the instant invention is to provide an idler assembly for a belt conveyor comprising a frame assembly having oppositely disposed stands spaced from each other forming the sides of the frame assembly, including means for supporting idler rolls extending between the stands, in which each stand includes a lower upright portion and an upper upright portion spaced from each other and connected by an inclined intermediate portion directed upwardly and outwardly with respect to the lower portion, whereby the upper portion of the stand is spaced outwardly with respect to the lower portion thereof.

Other objects of the invention will appear hereinafter, the novel features and combinations being set forth in the appended claims.

In the accompanying drawings:

FIG. 1 is an elevational view of the novel idler assembly of the instant invention;

FIG. 2 is a side elevational view of the idler assembly illustrated in FIG. 1;

FIG. 3 is an enlarged view, partially in section, of the troughing idler roll and the structure mounting the idler roll in the idler assembly;

FIG. 4 is a sectional view of the troughing idler roll mounting means taken on the line 4—4 of FIG. 3; and FIG. 5 is an exploded view of several elements of the frame assembly of the idler assembly of this invention.

Referring to the drawings there is illustrated therein the novel belt conveyor idler assembly of this invention, which includes a frame assembly 10 forming the supporting structure for the idler rolls of the idler assembly. The frame assembly 10 comprises a pair of stands 11, which are oppositely disposed one at each side of the idler assembly, and are spaced from each other. Each of the stands 11 is formed from plate material, and includes a foot 12 in which there is provided a plurality of elongated openings 13 (FIG. 5) for the reception of bolts 14, which may be anchored in a supporting foundation 15 for the idler assembly. Nuts 16 are threaded on the bolts 14 and bear against the foot 12 of the stand 11 to secure the idler assembly to the foundation 15. The openings 13 are elongated to permit adjustment of the position of the idler assembly in erecting the conveyor of which it is an element.

The stand 11 further comprises an upright plate portion 17 at the bottom thereof which is integral with the foot 12. An inclined intermediate plate portion 18 extends upwardly and outwardly from the bottom upright plate portion 17 and connects the latter to an upright plate portion 19 at the top of the stand 11. Thus, as seen in FIGS. 1 and 5, the upper plate portion 19 is disposed outwardly with respect to the bottom plate portion 17, with the integral inclined intermediate plate portion 18 connecting the plate portions 17, 19, whereby the stands 11 are self cleaning. A cap 20 is formed at the top of the upper plate portion 19 integrally therewith, and extends laterally inwardly therefrom. The opposite ends 21 of the cap 20 are turned down at about a 45° angle for a purpose to be described hereinafter. A post 22 is secured to the cap 20, as by welding, and stands in an upright position on the cap 20. A slot 23 extends downwardly into the post 22 from the top thereof.

The intermediate plate portion 18 is formed with an opening 24 adjacent the lower upright plate portion 17. An upright bracket 25 is secured to the lower plate portion 17 by suitable bolt and nut means 26. The bracket 25 is formed with a slotted opening 27 for the reception of the bolt and nut means 26, and to permit adjustment of the position of the bracket for proper alignment of the return idler roll 32, as will appear in greater detail hereinafter. The bracket 25 is mounted on the lower plate portion 17 and extends upwardly therefrom into the opening 24 in the intermediate plate portion 18, whereby the upper end of the bracket 25 is disposed on the inside of the stand 11, as seen in FIG. 1.

A yoke 30 is secured to the inner face of the bracket 25, as by welding, and the bracket 25 includes a slot 31 formed in the top thereof, which is aligned with the yoke 30. The brackets 25 on the opposite stands 11 support the return idler roll 32, with the yokes 30 forming seats for the ends of the return idler roll 32.

The return idler roll 32 comprises a laterally extending tubular element 33 to the periphery of which there are secured a plurality of individual rolls 34, these rolls being spaced along the length of the tubular element 33, and rotating with the tubular element 33 as an integral unit. Within the tubular element 33 there is disposed a dead shaft 35, with the tubular element 33 being mounted on the dead shaft 35 by suitable bearing means, which permits the tubular element 33 to rotate relatively to the dead shaft 35 in a manner well-known to those skilled in the art. At each end of the dead shaft 35 there is secured a hexagonal nut 36 which is received within the yokes 30 on the brackets 25. Each yoke 30 is formed with a sectional shape that is complementary to the hexagonal nut 36, as seen in FIG. 2, and thereby fixedly receives the hexagonal nut 36 to prevent rotation of the dead shaft 35. The ends of the dead shaft 35 extend through the slots 31 in the brackets 25 and are formed with grease fittings for lubrication of the return idler roll bearings. The return run 37 of the conveyor belt is supported on the peripheries of the rolls 34 of the return idler roll 32.

The opposite stands 11 are joined in the frame assembly 10 by a pair of transversely extending frame members 40 which may be formed from angles. Each frame member 40 is disposed under the cap 20 of the end stand 11, with each down turned end 21 of the cap 20 abutting one side of a frame member 40. The frame members 40 may be secured to the stands 11 in any suitable manner, as by welding. The post 22 is centrally aligned between the frame members 40, and is adapted to support an idler roll 41 which extends between the stands 11 and is centrally located with respect to the load carrying run of the conveyor belt 42, to suport the load carrying run of the conveyor belt 42. The idler roll 41 comprises a tubular element 43 to the periphery of which there are secured in any suitable manner, as by welding, a plurality of rolls 44, which are uniformly spaced on the tubular element 43 and form with the latter an integral element. Within the tubular element 43 there is disposed a dead shaft 45, with tubular element 43 being mounted on the dead shaft 45 by suitable bearing means in a manner well-known to those skilled in the art, for the purpose of permitting rotation of the tubular element 43 relatively to the dead shaft 45. At each end of the dead shaft 45 there is secured a hexagonal nut element 46, which is seated within a yoke 47 which is secured to the inner face of the post 22 in alignment with the slot 23. The yoke 47 is complementally formed with respect to the hexagonal nut element 46 for the purpose of fixedly seating the hexagonal nut element 46 therein, and to prevent rotation of the dead shaft 45. The ends of the dead shaft 45 extend outwardly beyond the posts 22 through the slots 23 therein and include suitable grease fittings for lubrication of the bearings of the idler roll 41.

At each side of the idler roll assembly there is provided a troughing idler roll 50 which is disposed on an inclined axis extending upwardly and outwardly, with the troughing idler roll 50 being adapted to engage the marginal portion 51 of the load carrying run 42 of the conveyor belt, to form the load carrying run 42 of the conveyor belt into a troughed configuration, as seen in FIG. 1. The troughing idler roll 50 is rotatably mounted on a bracket 52 which includes a dead shaft and bearings rotatably mounting the troughing idler roll 50 on the dead shaft in a manner well-known to those skilled in the art, and therefore not described in detail herein.

The bracket 52 includes a foot 53 which extends under the troughing idler roll 50 in the direction of the stand 11. The foot 53 is seated on a frame member 40 and is complementally formed with respect thereto, as best seen in FIG. 4, being thereby adapted to slide along the frame member 40. A shoe 54 is disposed under the frame member 40 opposite the foot 53 of the bracket 52, and the shoe 54 is also complementally formed with respect to the frame member 40, as best seen in FIG. 4. An elongated opening 55 is formed in the frame member 40 between the foot 53 and the shoe 54. The foot 53 is formed with an upwardly facing seat and opening 56 for the reception of a bolt 57 which extends through the foot 53 and the opening 55 of the frame member 40 and is threaded into the shoe 54. Upon tightening the bolt 57, the foot 53 and the shoe 54 are brought into tight engagement with the frame member 40, thereby fixing the position of the troughing idler roll 50. By loosening the bolt 57, the foot 53 and the shoe 54, which together form an assembly, may be slid along the frame member 40 for the purpose of properly locating the troughing idler roll 50 in the desired position.

In order to slide the troughing idler assembly along the frame member 40, there is provided a bolt 58 carried by the frame assembly 10 in an aperture 59 formed in the stand 11. The bolt 58 extends through the aperture 59 towards the shoe 54 and is threadedly engaged with an enlarged end 60 of the shoe 54. A collar 61 is secured to the shank of the bolt 58 on the inside of the stand 11, for the purpose of preventing translational movement of the bolt 58 relatively to the stand 11. Thus, the troughing idler roll 50 can be adjusted by rotation of the bolt 58, which causes the foot 53, shoe 54 assembly to slide along the frame member 40. After the troughing idler roll has been properly positioned, the bolt 57 may be tightened to secure the troughing idler roll 50 in its adjusted position. This operation may be accomplished while the conveyor continues to operate.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A troughing idler assembly for a conveyor belt adapted to support and guide the conveyor belt in its load carrying run comprising, a transversely disposed belt supporting idler roll centrally located with respect to the longitudinal run of the conveyor belt to support the conveyor belt, a troughing idler roll disposed at the side of the idler assembly for engaging a marginal portion of the conveyor belt, said troughing roll being disposed on an inclined axis with respect to the belt supporting roll to trough the conveyor belt, a transversely extending frame member for mounting the troughing roll in the idler assembly, a bracket including means for rotatably supporting the troughing roll, said bracket including a foot portion engaging the frame member for seating the bracket on the frame member, said foot portion extending along the frame member outwardly of the conveyor belt, a shoe disposed opposite said foot portion and under the frame member, a slot in the frame member extending longitudinally thereof and disposed between the foot portion and the shoe, and securing means extending through the slot and joining the bracket to the shoe adapted to secure the bracket and troughing roll to the frame member, said securing means being releasable for adjustment of the bracket and troughing roll with respect to the belt supporting idler roll and including means for releasing the securing means disposed in said foot portion at a position beyond the conveyor belt to be accessible from a side of the troughing idler assembly clear of the conveyor belt.

2. A troughing idler assembly for a conveyor belt adapted to support and guide the conveyor belt in its load carrying run comprising, a transversely disposed belt supporting idler roll centrally located with respect to the longitudinal run of the conveyor belt to support the conveyor belt, a troughing idler roll disposed at the side of the idler assembly for engaging a marginal portion of the conveyor belt, said troughing roll being disposed on an inclined axis with respect to the belt supporting roll to trough the conveyor belt, a frame for the idler assembly comprising a transversely extending frame member for mounting the troughing roll in the idler assembly, a bracket including means for rotatably supporting the troughing roll, said bracket including a foot portion engaging the frame member for seating the bracket on the frame member, said foot portion extending along the frame member outwardly of the conveyor belt, a shoe disposed opposite the bracket and under the frame member, securing means joining the bracket to the shoe and adapted to secure the bracket and troughing roll to the frame member, said securing means being releasable for adjustment of the bracket and troughing roll with respect to the belt supporting idler roll and including means for releasing the securing means disposed in said foot portion at a position beyond the conveyor belt to be accessible from a side of the troughing idler assembly clear of the conveyor belt, and screw means rotatably mounted in the frame and threadedly engaged with the shoe for adjusting the position of the troughing idler with respect to the belt supporting roll, said screw means including means for rotating the screw means disposed at an outer side of the frame to be accessible from a position clear of the troughing idler assembly.

3. A troughing idler assembly for a conveyor belt adaped to support and guide the conveyor belt in its load carrying run comprising, a transversely disposed belt supporting idler roll centrally located with respect to the longitudinal run of the conveyor belt to support the conveyor belt, a troughing idler roll disposed at the side of the idler assembly for engaging a marginal portion of the conveyor belt, said troughing roll being disposed on an inclined axis with respect to the belt supporting roll to trough the conveyor belt, a frame for the idler assembly comprising oppositely disposed stands forming the sides of the frame, a frame member extending transversely between said stands for mounting the troughing roll in the idler assembly, a bracket including means for rotatably supporting the troughing roll, said bracket being seated on the frame member, adjusting means connected to the bracket for adjusting the position of the troughing roll with respect to the belt supporting idler roll, said adjusting means being seated in a stand and extending through the stand to the outer side of the frame, and said adjusting means including means for operating the adjusting means disposed at an outer side of the stand and the frame for operation of the adjusting means and adjustment of the position of the troughing roll from a position clear of the troughing idler assembly.

References Cited in the file of this patent

UNITED STATES PATENTS

| 699,477 | Bee | May 6, 1902 |
| 2,554,037 | Lee | May 22, 1951 |
| 2,818,966 | Gill | Jan. 7, 1958 |

FOREIGN PATENTS

| 876,827 | Germany | May 18, 1953 |
| 307,838 | Switzerland | Aug. 16, 1955 |